United States Patent Office 3,207,570
Patented Sept. 21, 1965

3,207,570
PRODUCTION OF LITHIUM ALUMINIUM HYDRIDE
Heinrich Nöth, Munich, Germany, assignor to Imperial Chemical Industries Limited, London, England, a corporation of Great Britain
No Drawing. Filed May 24, 1962, Ser. No. 197,255
Claims priority, application Great Britain, Dec. 21, 1956, 38,975/56
8 Claims. (Cl. 23—14)

This application is a continuation-in-part of my application Serial No. 702,771, filed December 16, 1957, now abandoned.

This invention relates to the production of lithium aluminium hydride.

It is known to produce lithium aluminium hydride by reacting lithium hydride with aluminium chloride according to the following equation:

$$4LiH + AlCl_3 \rightarrow LiAlH_4 + 3LiCl$$

This process is unsatisfactory in that only 25% of the expensive lithium hydride starting material is converted into lithium aluminium hydride.

It would be valuable to be able to convert sodium aluminium hydride to lithium aluminium hydride by a simple metathetical reaction with a lithium salt, but this has hitherto been considered impossible, because the analogous reaction of sodium borohydride (which is, moreover, more salt-like than sodium aluminium hydride) takes place very inefficiently if it takes place at all. This is known from the publications of two groups of workers, Paul and Joseph (Bulletin de la Société Chimique de France, 1954, 550) and Kollonitsch, Fuchs and Gabor (Nature, 1954, 173, 125–6), and has since been confirmed by the following experiment:

ATTEMPTED REACTION OF SODIUM BOROHYDRIDE WITH LITHIUM CHLORIDE

Fourteen grams of sodium borohydride (98.2% pure as determined by hydride activity measurement) were placed in a 500 ml. three-necked flask fitted with a condenser, an agitator and a thermometer as a suspension in 200 mls. of tetrahydrofuran which had been free from peroxide by passing it through a column of activated alumina and then distilling it over sodium. There were then added 20 grams of lithium chloride (ca 95% pure after dehydration by the method described in Inorganic Synthesis, volume 5, page 154). The flask was immersed in a bath of running water to keep the temperature of the mixture at 20±1° C. and agitation was maintained for 8 hours. The mixture was filtered: the residue was washed twice with 25 mls. of fresh tetrahydrofuran and the washings were added to the filtrate. The total volume of the filtrate was 254 mls. A sample was analysed by titration with N/10 hydrochloric acid and followed by back-titration with N/10 sodium hydroxide. A further sample was analysed by titration with N/10 silver nitrate solution. A further sample was analysed for lithium by means of a flame photometer. From the results of these analyses it was calculated that the filtrate contained

| | Gram molecules per litre |
|---|---|
| Total borohydride | 0.06 |
| Chloride | 1.08 |

The total borohydride concentration represents a yield of 4.25% on the weight of the sodium borohydride starting material, but since sodium borohydride is soluble in tetrahydrofuran to the extent of 0.1% (Manual of Techniques using Sodium Borohydride and Potassium Borohydride, Metal Hydrides Inc., 1958), allowance must be made for soluble sodium borohydride, as follows:

| | Gram molecules per litre |
|---|---|
| Total borohydride | 0.06 |
| Soluble sodium borohydride (1 gram per litre, molecular weight 38) | 0.026 |
| Net $LiBH_4$ | 0.034 |

This concentration represents a yield of 2.4%; and this value must be an overestimate since the analyses showed that lithium ion was present at a concentration of 1.07 gram molecules per litre, which is just less than equivalent to the concentration of chloride ion. If lithium borohydride were present, its concentration should be equal to the excess of lithium ion concentration over chloride ion concentration, since the only soluble chloride in the system is lithium chloride.

The rest of the filtrate was evaporated to dryness in vacuo in an atmosphere of nitrogen and the resulting white solid was dried at 100° C. for 1½ hours, giving 9.1 grams of product. A sample of this was analysed by titration with N/10 hydrochloric acid and found to contain 1.21% boron. A sample was titrated with N/10 silver nitrate and was found to contain 75.1% of chlorine. A sample analysed by flame photometer was found to contain 15.7% of lithium. A sample reacted with acid gave a volume of hydrogen corresponding to a hydride ion content of 0.12%. Hence the product contained 90.5% of lithium chloride and 2.62% of borohydride calculated as lithium borohydride. For the reasons mentioned above it is believed that at least part of the borohydride was present as sodium borohydride.

I have now surprisingly found that sodium aluminium hydride can be caused to undergo a metathetical reaction with a lithium halide, if a liquid reaction medium chosen from a limited range of ether-like solvents is used.

It is an object of the present invention to provide an inexpensive and safe process for producing lithium aluminium hydride from sodium aluminium hydride.

According to the invention therefore there is provided a process for the production of lithium aluminium hydride which comprises reacting sodium aluminium hydride with a lithium halide in the presence of at least one liquid selected from the class of ethers consisting of tetrahydrofuran, tetrahydropyran, 4-methyl-tetrahydropyran and diethylene glycol dimethyl ether.

Any lithium halide may be used in the process. It is, however, preferred to use lithium chloride or lithium bromide, especially lithium chloride.

The above-mentioned liquids are substantially inert under the conditions of the process and in them the reactants, sodium aluminium hydride and a lithium halide, are appreciably soluble and the reaction products, lithium aluminium hydride and a sodium halide, are respectively appreciably soluble and relatively insoluble. In this way the progress of the reaction and the separation of the reaction products by, for example, filtration, are facilitated. Preferred from among those liquids are tetrahydrofuran, tetrahydropyran and diethylene glycol dimethyl ether. Tetrahydrofuran is especially valuable.

The reaction takes place at a practicable rate at temperatures of 0° C. upwards, but it is preferred to operate it at higher temperatures, not exceeding of course the decomposition temperature of lithium aluminium hydride, and preferably up to about 135° C. The pressure is suitably atmospheric though pressures above and below atmospheric may be employed.

The reaction mixture should be well stirred; and hence it is advantageous to maintain the liquid boiling under reflux conditions. This is possible at acceptable temperatures and atmospheric pressure when any of the above liquids other than diethylene glycol dimethyl ether is used pure as the reaction medium.

It is very desirable that the process should be carried out in the absence of water, oxygen and carbon dioxide. Air is suitably displaced from the apparatus by an inert atmosphere of for example, nitrogen, hydrogen or an inert gas from Group O of the Periodic Table, for example argon. Any liquid used is preferably thoroughly dried before use.

The reaction product comprises a solution of lithium aluminium hydride and a precipitate of a sodium halide. The sodium halide may be separated by for example, decantation, filtration or centrifuging or a combination of these processes. The solvent may then be distilled from the solution of lithium aluminium hydride, and this leaves a residue containing lithium aluminium hydride and any excess lithium halide or any unreacted sodium aluminium hydride. If desired, excess lithium halide and unreacted sodium aluminium hydride may be removed by mixing the reaction product with a liquid which is inert under the conditions of the process and in which lithium aluminium hydride is soluble but lithium halides and sodium aluminium hydride are substantially insoluble. Diethyl ether is highly suitable. The precipitated sodium halide and sodium aluminium hydride or lithium halide are then separated and the resulting clear liquor is evaporated to give lithium aluminium hydride. As an alternative, lithium aluminium hydride may be extracted from the crude solid product by means of diethyl ether.

The invention is illustrated by the following examples.

Example 1

4.2 gm. anhydrous, finely powdered lithium chloride and 50 ml. anhydrous tetrahydrofuran were placed in a dry flask fitted with a stirrer, a reflux condenser and a dropping funnel and from which air was displaced by a stream of nitrogen. The flask was then heated until the tetrahydrofuran boiled under reflux, the contents of the flask vigorously stirred and 131 ml. of a 0.76 molar solution of sodium aluminium hydride in tetrahydrofuran gradually introduced into the flask over a period of half an hour. The reaction mixture was then heated under reflux and stirred for a further half hour, allowed to settle and the clear solution decanted from the precipitate. The precipitate was then washed with 20 ml. anhydrous tetrahydrofuran and a second clear solution obtained which was added to the first one. The combined solutions were then distilled to remove the bulk of the tetrahydrofuran and the distillation residue heated in vacuo at 100° C.–120° C. 4.9 gm. of a white product were obtained which analysis for lithium and hydrogen showed to contain 75.5% of lithium aluminium hydride. The impurity was mainly tetrahydrofuran. The yield of lithium aluminium hydride was 98%, calculated on the sodium aluminium hydride used.

Example 2

To 0.259 g. of sodium aluminium hydride (70% pure) in a flask filled with argon there were added 20.5 mls. of a solution in tetrahydrofuran of 0.17 g. (18% excess) of lithium chloride. The resulting mixture was with stirring brought to the boil and maintained boiling under reflux for 2 hours. A further 20 mls. of cold tetrahydrofuran were then added, whereafter the mixture was stirred for a further 30 minutes, by which time it had cooled. Then 40 mls. of dry diethyl ether were added to precipitate the excess lithium chloride and any unreacted sodium aluminium hydride. The mixture was filtered under an argon atmosphere through a sintered glass filter. The residue was washed with diethyl ether and the washings were added to the filtrate. The filtrate was evaporated to dryness, the product resulting being dried for 3 hours at 100° C. to give 0.174 g. of a white powder. By analysis it was found to contain no sodium or chlorine. Its lithium content was 7.95% and its lithium to active hydrogen ratio was 1 to 3.9. The yield was 60.6% calculated as pure lithium aluminium hydride.

Example 3

A solution of 0.21 g. of sodium aluminium hydride (90% pure) and 0.175 g. (16% excess) of lithium chloride in 25 mls. of tetrahydrofuran was stirred at room temperature (about 22° C.) in an argon-filled flask for 22 hours, whereafter 70 mls. of dry diethyl ether were stirred in. The resulting mixture was filtered in an argon atmosphere. The filtrate was evaporated to dryness, leaving a white powder which after drying for 1½ hours at 110° C. in vacuo gave 0.073 g. of a white powder. This was shown by analysis to contain 0.0403 g. of lithium aluminium hydride, representing a yield of 30.3%.

Example 4

A solution of 0.4 g. of sodium aluminium hydride (70% pure) and 0.5 g. (11% excess) of lithium bromide in 30 mls. of tetrahydrofuran was stirred and refluxed in argon atmosphere for 2 hours. The mixture was cooled and filtered; and to the filtrate were added 60 mls. of dry diethyl ether. Excess lithium bromide and unreacted sodium aluminium hydride separated and were filtered off. The filtrate was evaporated to dryness to give a white solid which after drying in vacuo for 2 hours at 110° C. weighed 0.131 g. This solid was free of sodium. The yield was 4.7%.

Example 5

A solution of 0.252 g. of sodium aluminium hydride (70% pure) and 0.190 g. (37% excess) of lithium chloride in 25 mls. of tetrahydropyran was stirred and refluxed in an argon atmosphere for 3 hours, then cooled. Then 75 mls. of dry diethyl ether were stirred in and the resulting mixture was filtered in an argon atmosphere. The filtrate was evaporated to dryness. The resulting white powder was dried at 100° C. for 3 hours and analysed. Its active hydrogen content corresponded to 0.0345 g. of lithium aluminium hydride, a yield of 26.8%. A minor proportion of reaction products arising from the fission of the tetrahydropyran solvent was noted.

Example 6

A solution of 0.227 g. of sodium aluminium hydride (90% pure) and 0.212 g. (31% excess) of lithium chloride in 30 mls. of 4-methyl tetrahydropyran was in an argon atmosphere stirred and refluxed for 3 hours, then cooled. To the mixture 70 mls. of dry diethyl ether were added, whereafter the mixture was filtered and the filtrate evaporated to dryness. The resulting white solid was dried for 2 hours in vacuo at 110° C. and gave 0.157 g. of a product which was shown by analysis to contain 0.0274 g. of lithium aluminium hydride. The yield was 20.5%.

Example 7

In this example which illustrates the process when taking place in diethylene glycol dimethyl ether the reaction was not conducted at reflux temperature, nor was the lithium aluminium hydride isolated by evaporation to dryness. This was because diethylene glycol dimethyl ether boils at 162° C. at atmospheric pressure.

A mixture of 0.216 g. of sodium aluminium hydride (70% pure), 0.15 g. (27% excess) of lithium chloride and 40 mls. of diethylene glycol dimethyl ether was stirred at 100° C. for 3 hours in an argon atmosphere. This mixture was then filtered. The filtrate was analysed, with the following results:

Sodium _____ Absent
Lithium aluminium hydride (calculated from total
  hydride activity) _____g__ 0.039

This weight of lithium aluminium hydride represents a yield of 36.7%.

I claim:
1. A process for the production of lithium aluminium hydride which comprises reacting sodium aluminium hydride with a lithium halide in the presence of at least one liquid selected from the class of ethers consisting of tetrahydrofuran and diethylene glycol dimethyl ether.
2. A process according to claim 1 when conducted in an inert atmosphere.
3. A process according to claim 2 when conducted in an argon atmosphere.
4. A process according to claim 1 wherein the lithium halide is lithium chloride.
5. A process according to claim 1 wherein the liquid is tetrahydrofuran.
6. A process according to claim 1 wherein the liquid is diethylene glycol dimethyl ether.
7. A process according to claim 1 when carried out at the temperature of reflux at atmospheric pressure.
8. A process for the production of lithium aluminium hydride which comprises reacting sodium aluminium hydride with lithium chloride under an inert atmosphere and in the presence of tetrahydrofuran heated to reflux and separating lithium aluminium hydride from the reaction product thus formed.

References Cited by the Examiner

UNITED STATES PATENTS 2,920,935   1/60   Finholt _____ 23—14

FOREIGN PATENTS 820,513   9/59   Great Britain.

OTHER REFERENCES

Gaylord: "Reduction With Complex Metal Hydrides"; copyright date is Feb. 29, 1956, p. 42.

MAURICE A. BRINDISI, *Primary Examiner.*